(12) United States Patent
Iwakuni et al.

(10) Patent No.: US 6,169,511 B1
(45) Date of Patent: Jan. 2, 2001

(54) RADAR DETECTOR

(75) Inventors: Mikio Iwakuni; Masahiro Takiguchi, both of Tokyo (JP)

(73) Assignee: Uniden Corporation, Tokyo (JP)

( * ) Notice: Under 35 U.S.C. 154(b), the term of this patent shall be extended for 0 days.

(21) Appl. No.: 09/136,049

(22) Filed: Aug. 18, 1998

(51) Int. Cl.[7] ...................................................... G01S 7/40
(52) U.S. Cl. .............................. 342/20; 342/13; 342/195; 455/227; 455/229
(58) Field of Search ................................ 342/13, 20, 175, 342/192–197; 455/226.1–226.4, 227, 228, 229

(56) References Cited

U.S. PATENT DOCUMENTS

| | | | |
|---|---|---|---|
| 4,313,216 | * | 1/1982 | Jaeger et al. ........................ 455/226.1 |
| 5,010,341 | * | 4/1991 | Huntley et al. ......................... 342/20 |
| 5,835,052 | | 11/1998 | Iwakuni . |

FOREIGN PATENT DOCUMENTS

| | | |
|---|---|---|
| 59-109970 | 7/1984 | (JP) . |
| 59-131184 | 7/1984 | (JP) . |
| 61-177803 | 8/1986 | (JP) . |
| 61-186876 | 8/1986 | (JP) . |
| 63-95707 | 4/1988 | (JP) . |
| 63-217703 | 9/1988 | (JP) . |
| 64-25602 | 1/1989 | (JP) . |
| 3-99288 | 4/1991 | (JP) . |
| 6-174826 | 6/1994 | (JP) . |
| 7-35845 | 2/1995 | (JP) . |
| 7-263965 | 10/1995 | (JP) . |

* cited by examiner

*Primary Examiner*—Bernarr E. Gregory
(74) *Attorney, Agent, or Firm*—McDermott, Will & Emery

(57) ABSTRACT

A radar detector is comprised of a voltage controlling oscillator (VCO) instead of DROs, thereby decreasing the cost of radar detector. The radar detector comprises a voltage controlled 1st local oscillator generates a signal of a frequency of 11.2796 GHz to 11.9832 Ghz, two (2) 2nd local oscillators generate signals with frequencies of 0.603 GHz and 1.3668 GHz, a memory section which stores pair combination data indicating the relation between the frequency of said voltage controlled oscillator, the frequencies of said local oscillators and the frequency of the received radar signal in advance; and a controlling section which decides the frequency of a radar signal by comparing the obtained information with said pair combination data.

23 Claims, 23 Drawing Sheets

| Segment Number | -5 | -4 | -3 | -2 | -1 | 0 | 1 | 2 | 3 | 4 | 5 |
|---|---|---|---|---|---|---|---|---|---|---|---|
| 1ST LOCAL FREQ. (GHz) | 11.2796 | 11.2930 | 11.2970 | 11.3011 | 11.3051 | 11.3092 | 11.3132 | 11.3266 | 11.340 | 11.3534 | 11.3668 |
| FUNDAMENTAL MIXING (X BAND) IF=1.3668GHz | | | | | | | | | | | |
| IF=0.603GHz | | | | | | | | | | | |
| 2ND HARMONICS MIXING (K BAND) IF=1.3668GHz | | 23.9528 | 23.9609 | 23.9690 | 23.9770 | 23.9851 | 23.9932 | 24.0200 | 24.0468 | 24.0736 | 24.1004 |
| IF=0.603GHz | | | | | | | | | | | |
| 3RD HARMONICS MIXING (Ka BAND) IF=1.3668GHz | | | | | | 35.2943 | 35.3064 | 35.3466 | 35.3868 | 35.4270 | 35.4672 |
| IF=-1.3668GHz | | | | | | 34.5305 | 34.5426 | 34.5828 | 34.6230 | 34.6632 | 34.7034 |
| IF=0.603GHz | 33.2358 | 33.2760 | 33.2881 | 33.3002 | 33.3124 | 33.3245 | 33.3366 | 33.3768 | 33.4170 | 33.4572 | 33.4974 |
| IF=-0.603GHz | | | | | | | | | | | |

FIG. 4

PROGRAMMED TABLE FOR Ka BAND (EXTERNAL MIX BIAS = OFF)

| SEGMENT NUMBER | | 6 | 7 | 8 | 9 | 10 | 11 | 12 | 13 |
|---|---|---|---|---|---|---|---|---|---|
| 1ST LOCAL FREQ. (GHz) | | 11.3802 | 11.3936 | 11.4070 | 11.4204 | 11.4338 | 11.4472 | 11.4606 | 11.474 |
| FUNDAMENTAL MIXING (X BAND) | IF=1.3668GHz | | | | | | | | |
| | IF=0.603GHz | | | | | | | | |
| 2ND HARMONICS MIXING (K BAND) | IF=1.3668GHz | 24.1272 | 24.1540 | 24.1808 | 24.2076 | 24.2344 | 24.2612 | 24.2880 | 24.3148 |
| | IF=0.603GHz | | | | | | | | |
| 3RD HARMONICS MIXING (Ka BAND) | IF=1.3668GHz | 35.5074 | 35.5476 | 35.5878 | 35.6280 | 35.6682 | 35.7084 | 35.7486 | 35.7888 |
| | IF=-1.3668GHz | | | | | | | | |
| | IF=0.603GHz | 34.7436 | 34.7838 | 34.8240 | 34.8642 | 34.9044 | 34.9446 | 34.9848 | 35.0250 |
| | IF=-0.603GHz | 33.5376 | 33.5778 | 33.6180 | 33.6582 | 33.6984 | 33.7386 | 33.7788 | 33.8190 |

PROGRAMMED TABLE FOR Ka BAND (EXTERNAL MIX BIAS = OFF)

FIG.4A

| SEGMENT NUMBER | | 14 | 15 | 16 | 17 | 18 | 19 | 20 | 21 | 22 | 23 | 24 |
|---|---|---|---|---|---|---|---|---|---|---|---|---|
| 1ST LOCAL FREQ. (GHz) | | 11.4874 | 11.5008 | 11.5142 | 11.5276 | 11.5410 | 11.5544 | 11.5678 | 11.5812 | 11.5946 | 11.608 | 11.6214 |
| FUNDAMENTAL MIXING (X BAND) | IF=1.3668GHz | | | | | | | | | | | |
| | IF=0.603GHz | | | | | | | | | | | |
| 2ND HARMONICS MIXING (K BAND) | IF=1.3668GHz | 24.3416 | | | | | | | | | | |
| | IF=0.603GHz | | | | | | | | 23.8458 | | | |
| 3RD HARMONICS MIXING (Ka BAND) | IF=1.3668GHz | 35.8290 | 35.8692 | 35.9094 | 35.9496 | 35.9898 | 36.0300 | 36.0702 | 36.1104 | 36.1506 | | |
| | IF=-1.3668GHz | 33.0954 | 33.1356 | 33.1758 | 33.2160 | 33.2562 | 33.2964 | 33.3366 | 33.3768 | 33.4170 | 33.4572 | 33.4974 |
| | IF=0.603GHz | 35.0652 | 35.1054 | 35.1456 | 35.1858 | 35.2260 | 35.2662 | 35.3064 | 35.3466 | 35.3868 | 35.4270 | 35.4672 |
| | IF=-0.603GHz | 33.8592 | 33.8994 | 33.9396 | 33.9798 | 34.0200 | 34.0602 | 34.1004 | 34.1406 | 34.1808 | 34.2210 | 34.2612 |

PROGRAMMED TABLE FOR Ka BAND (EXTERNAL MIX BIAS = OFF)

FIG.5

| SEGMENT NUMBER | | 25 | 26 | 27 | 28 | 29 | 30 | 31 | 32 |
|---|---|---|---|---|---|---|---|---|---|
| 1ST LOCAL FREQ. (GHz) | | 11.6348 | 11.6482 | 11.6616 | 11.6750 | 11.6884 | 11.7018 | 11.7152 | 11.7286 |
| FUNDAMENTAL MIXING (X BAND) | IF=1.3668GHz | | | | | | | | |
| | IF=0.603GHz | | | | | | | | |
| 2ND HARMONICS MIXING (K BAND) | IF=1.3668GHz | 23.8726 | 23.8994 | 23.9262 | 23.9530 | 23.9798 | 24.0066 | 24.0334 | 24.0602 |
| | IF=0.603GHz | | | | | | | | |
| 3RD HARMONICS MIXING (Ka BAND) | IF=-1.3668GHz | 33.5376 | 33.5778 | 33.6180 | 33.6582 | 33.6984 | 33.7386 | 33.7788 | 33.8190 |
| | IF=0.603GHz | 35.5074 | 35.5476 | 35.5878 | 35.6280 | 35.6682 | 35.7084 | 35.7486 | 35.7888 |
| | IF=-0.603GHz | 34.3014 | 34.3416 | 34.3818 | 34.4220 | 34.4622 | 34.5024 | 34.5426 | 34.5828 |

FIG. 5A

PROGRAMMED TABLE FOR Ka BAND (EXTERNAL MIX BIAS = OFF)

| SEGMENT NUMBER | | 33 | 34 | 35 | 36 | 37 | 38 | 39 | 40 | 41 | 42 | 43 |
|---|---|---|---|---|---|---|---|---|---|---|---|---|
| 1ST LOCAL FREQ. (GHz) | | 11.742 | 11.7554 | 11.7688 | 11.7822 | 11.7956 | 11.8090 | 11.8224 | 11.8358 | 11.8492 | 11.8626 | 11.876 |
| FUNDAMENTAL MIXING (X BAND) | IF=1.3668GHz | | | | | 10.4288 | 10.4422 | 10.4556 | 10.4690 | 10.4824 | 11.4958 | 10.5092 |
| | IF=0.603GHz | | | | | | | | | | | |
| 2ND HARMONICS MIXING (K BAND) | IF=1.3668GHz | 24.0870 | 24.1138 | 24.1406 | 24.1674 | 24.1942 | 24.2210 | 24.2478 | 24.2746 | 24.3014 | 24.3282 | 24.3550 |
| | IF=0.603GHz | | | | | | | | | | | |
| 3RD HARMONICS MIXING (Ka BAND) | IF=1.3668GHz | 33.8592 | 33.8994 | 33.9396 | 33.9798 | 34.0200 | 34.0602 | 34.1004 | 34.1406 | 34.1808 | 34.2210 | 34.2612 |
| | IF=0.603GHz | 35.8290 | 35.8692 | 35.9094 | 35.9496 | 35.9898 | 36.0300 | 36.0702 | 36.1104 | 36.1506 | | |
| | IF=-0.603GHz | 34.6230 | 34.6632 | 34.7034 | 34.7436 | 34.7838 | 34.8240 | 34.8642 | 34.9044 | 34.9446 | 34.9848 | 35.0250 |

PROGRAMMED TABLE FOR Ka BAND (EXTERNAL MIX BIAS = OFF)

FIG.6

| SEGMENT NUMBER | | 44 | 45 | 46 | 47 | 48 | 49 | 50 | 51 |
|---|---|---|---|---|---|---|---|---|---|
| 1ST LOCAL FREQ. (GHz) | | 11.8894 | 11.9028 | 11.9162 | 11.9296 | 11.9430 | 11.9564 | 11.9698 | 11.9832 |
| FUNDAMENTAL MIXING | IF=1.3668GHz | 10.5226 | 10.5360 | 10.5494 | 10.5628 | 10.5762 | | | |
| (X BAND) | IF=0.603GHz | | | | | | | | |
| 2ND HARMONICS MIXING | IF=1.3668GHz | | | | | | | | |
| (K BAND) | IF=0.603GHz | | | | | | | | |
| 3RD HARMONICS MIXING | IF=-1.3668GHz | 34.3014 | 34.3416 | 34.3818 | 34.4220 | 34.4622 | 34.5024 | 34.5426 | 34.5828 |
| | IF=0.603GHz | 35.0652 | 35.1054 | 35.1456 | 35.1858 | 35.2260 | 35.2662 | 35.3064 | 35.3466 |
| (Ka BAND) | IF=-0.603GHz | | | | | | | | |

FIG.6A

PROGRAMMED TABLE FOR Ka BAND (EXTERNAL MIX BIAS = OFF)

| SEGMENT NUMBER | | -5 | -4 | -3 | -2 | -1 | 0 | 1 | 2 | 3 | 4 | 5 |
|---|---|---|---|---|---|---|---|---|---|---|---|---|
| 1ST LOCAL FREQ. (GHz) | | 11.2796 | 11.2930 | 11.2997 | 11.3064 | 11.3132 | 11.3199 | 11.3266 | 11.340 | 11.3534 | 11.3668 | 11.3802 |
| FUNDAMENTAL MIXING (X BAND) | IF=1.3668GHz | | | | | | | | | | | |
| | IF=0.603GHz | | | | | | | | | | | |
| 2ND HARMONICS MIXING (K BAND) | IF=1.3668GHz | | 23.9528 | 23.9662 | 23.9797 | 23.9931 | 24.0066 | 24.0200 | 24.0468 | 24.0736 | 24.1004 | 24.1272 |
| | IF=0.603GHz | | | | | | | | | | | |
| 3RD HARMONICS MIXING (Ka BAND) | IF=1.3668GHz | | | | | | 35.2964 | 35.3466 | 35.3868 | 35.4270 | 35.4642 | 35.5074 |
| | IF=-1.3668GHz | | | | | | 34.5626 | 34.5828 | 34.6230 | 34.6632 | 34.7034 | 34.7436 |
| | IF=0.603GHz | | | | | | 33.3566 | 33.3768 | 33.4170 | 33.4572 | 33.4974 | 33.5376 |
| | IF=-0.603GHz | 33.2358 | 33.2760 | 33.2962 | 33.3163 | 33.3365 | | | | | | |

PROGRAMMED TABLE FOR X AND K BAND (EXTERNAL MIX BIAS = ON)

FIG. 7

| SEGMENT NUMBER | | 6 | 7 | 8 | 9 | 10 | 11 | 12 | 13 |
|---|---|---|---|---|---|---|---|---|---|
| 1ST LOCAL FREQ. (GHz) | | 11.3936 | 11.4070 | 11.4204 | 11.4338 | 11.4472 | 11.4606 | 11.474 | 11.4874 |
| FUNDAMENTAL MIXING | IF=1.3668GHz | | | | | | | | |
| (X BAND) | IF=0.603GHz | | | | | | | | |
| 2ND HARMONICS MIXING | IF=1.3668GHz | 24.1540 | 24.1808 | 24.2076 | 24.2344 | 24.2612 | 24.2880 | 24.3148 | 24.3416 |
| (K BAND) | IF=0.603GHz | | | | | | | | |
| 3RD HARMONICS MIXING | IF=1.3668GHz | 35.5476 | 35.5878 | 35.6280 | 35.6682 | 35.7084 | 35.7486 | 35.7888 | 35.8290 |
| | IF=-1.3668GHz | | | | | | | | |
| (Ka BAND) | IF=0.603GHz | 34.7838 | 34.8240 | 34.8642 | 34.9044 | 34.9446 | 34.9848 | 35.0250 | 35.0652 |
| | IF=-0.603GHz | 33.5778 | 33.6180 | 33.6582 | 33.6984 | 33.7386 | 33.7788 | 33.8190 | 33.8592 |

FIG. 7A

PROGRAMMED TABLE FOR X AND K BAND (EXTERNAL MIX BIAS = ON)

| SEGMENT NUMBER | | 14 | 15 | 16 | 17 | 18 | 19 | 20 | 21 | 22 | 23 | 24 |
|---|---|---|---|---|---|---|---|---|---|---|---|---|
| 1ST LOCAL FREQ. (GHz) | | 11.5008 | 11.5142 | 11.5276 | 11.5410 | 11.5544 | 11.5678 | 11.5812 | 11.5946 | 11.6080 | 11.6214 | 11.6348 |
| FUNDAMENTAL MIXING (X BAND) | IF=1.3668GHz | | | | | | | | | | | |
| | IF=0.603GHz | | | | | | | | | | | |
| 2ND HARMONICS MIXING (K BAND) | IF=1.3668GHz | 24.3684 | | | | | | | | | | |
| | IF=0.603GHz | | | | | | | | | | | 23.8726 |
| 3RD HARMONICS MIXING (Ka BAND) | IF=1.3668GHz | 35.8692 | 35.9094 | 35.9496 | 35.9898 | 36.0300 | 36.0702 | 36.1104 | 36.1506 | 36.1908 | | |
| | IF=-1.3668GHz | 33.1356 | 33.1758 | 33.2160 | 33.2562 | 33.2964 | 33.3366 | 33.3768 | 33.4170 | 33.4572 | 33.4974 | 33.5376 |
| | IF=0.603GHz | 35.1054 | 35.1456 | 35.1858 | 35.2260 | 35.2662 | 35.3064 | 35.3466 | 35.3868 | 35.4270 | 35.4672 | 35.5074 |
| | IF=-0.603GHz | 33.8994 | 33.9396 | 33.9798 | 34.0200 | 34.0602 | 34.1004 | 34.1406 | 34.1808 | 34.2210 | 34.2612 | 34.3014 |

PROGRAMMED TABLE FOR X AND K BAND (EXTERNAL MIX BIAS = ON)

FIG.8

| SEGMENT NUMBER | | 25 | 26 | 27 | 28 | 29 | 30 | 31 | 32 |
|---|---|---|---|---|---|---|---|---|---|
| 1ST LOCAL FREQ. (GHz) | | | | | | | | | |
| FUNDAMENTAL MIXING | IF=1.3668GHz | 11.6482 | 11.6616 | 11.6750 | 11.6884 | 11.7018 | 11.7152 | 11.7286 | 11.742 |
| (X BAND) | IF=0.603GHz | | | | | | | | |
| 2ND HARMONICS MIXING | IF=1.3668GHz | | | | | | | | |
| (K BAND) | IF=0.603GHz | 23.8994 | 23.9262 | 23.9530 | 23.9798 | 23.0066 | 24.0334 | 24.0602 | 24.0870 |
| 3RD HARMONICS MIXING | IF=1.3668GHz | | | | | | | | |
| | IF=-1.3668GHz | 33.5778 | 33.6180 | 33.6582 | 33.6984 | 33.7386 | 33.7788 | 33.8190 | 33.8592 |
| (Ka BAND) | IF=0.603GHz | 35.5476 | 35.5878 | 35.6280 | 35.6682 | 35.7084 | 35.7486 | 35.7888 | 35.8290 |
| | IF=-0.603GHz | 34.3416 | 34.3818 | 34.4220 | 34.4622 | 34.5024 | 34.5426 | 34.5828 | 34.6230 |

FIG.8A

PROGRAMMED TABLE FOR X AND K BAND (EXTERNAL MIX BIAS = ON)

| SEGMENT NUMBER | | 33 | 34 | 35 | 36 | 37 | 38 | 39 | 40 | 41 | 42 | 43 |
|---|---|---|---|---|---|---|---|---|---|---|---|---|
| 1ST LOCAL FREQ. (GHz) | | 11.7554 | 11.7688 | 11.7822 | 11.7956 | 11.8090 | 11.8224 | 11.8358 | 11.8492 | 11.8626 | 11.8726 | 11.8826 |
| FUNDAMENTAL MIXING (X BAND) | IF=1.3668GHz | | | | | | | | | | | |
| | IF=0.603GHz | | | | | 10.4422 | 10.4556 | 10.4690 | 10.4824 | 11.4958 | 10.5058 | 10.5158 |
| 2ND HARMONICS MIXING (K BAND) | IF=1.3668GHz | | | | | | | | | | | |
| | IF=0.603GHz | 24.1138 | 24.1406 | 24.1674 | 24.1942 | 24.2210 | 24.2478 | 24.2746 | 24.3014 | 24.3282 | 24.3482 | 24.3682 |
| 3RD HARMONICS MIXING (Ka BAND) | IF=-1.3668GHz | 33.8994 | 33.9396 | 33.9798 | 34.0200 | 34.0602 | 34.1004 | 34.1406 | 34.1808 | 34.2210 | 34.2510 | 34.2810 |
| | IF=0.603GHz | 35.8692 | 35.9094 | 35.9496 | 35.9898 | 36.0300 | 36.0702 | 36.1104 | 36.1506 | 36.1908 | | |
| | IF=-0.603GHz | 34.6632 | 34.7034 | 34.7436 | 34.7838 | 34.8240 | 34.8642 | 34.9044 | 34.9446 | 34.9848 | 35.0148 | 35.0448 |

PROGRAMMED TABLE FOR X AND K BAND (EXTERNAL MIX BIAS = ON)

FIG.9

| SEGMENT NUMBER | | 44 | 45 | 46 | 47 | 48 | 49 | 50 | 51 |
|---|---|---|---|---|---|---|---|---|---|
| 1ST LOCAL FREQ. (GHz) | | 11.8926 | 11.9026 | 11.9126 | 11.9226 | 11.9326 | 11.9426 | 11.9526 | 11.9626 |
| FUNDAMENTAL MIXING | IF=1.3668GHz | 10.5258 | 10.5358 | 10.5458 | 10.5558 | 10.5658 | | | |
| (X BAND) | IF=0.603GHz | | | | | | | | |
| 2ND HARMONICS MIXING | IF=1.3668GHz | | | | | | | | |
| (K BAND) | IF=0.603GHz | | | | | | | | |
| 3RD HARMONICS MIXING | IF=1.3668GHz | 34.3110 | 34.3410 | 34.3710 | 34.4010 | 34.4310 | 34.4610 | 34.4910 | 34.5210 |
| | IF=-0.603GHz | 35.0748 | 35.1048 | 35.1348 | 35.1348 | 35.1648 | 35.1948 | 35.2248 | 35.2548 |
| (Ka BAND) | IF=-0.603GHz | | | | | | | | |

FIG. 9A

PROGRAMMED TABLE FOR X AND K BAND (EXTERNAL MIX BIAS = ON)

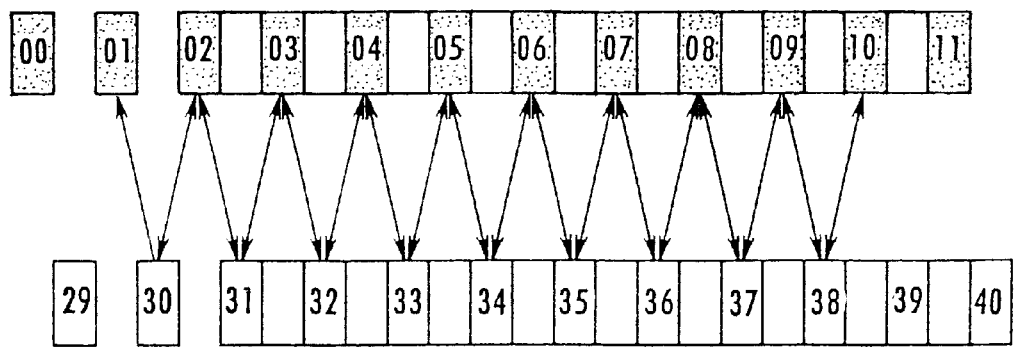
K BAND
FIG.11(a)
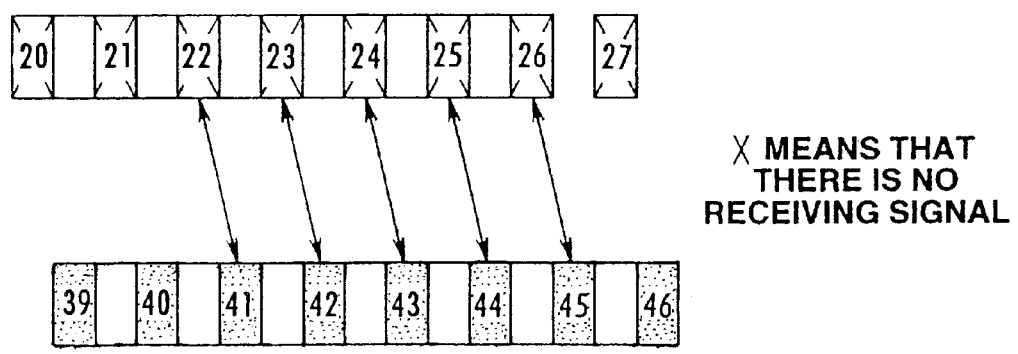
X̶ MEANS THAT
THERE IS NO
RECEIVING SIGNAL
X BAND
FIG.11(b)
 : 1st 1F=1.3668 GHZ
 : 1st 1F=0.603 GHZ

SCHEMATIC

WAVEFORM

RADAR DETECTOR

BACKGROUND OF THE INVENTION

1. Field of the Invention

The present invention relates to a radar detector for detecting microwave signals transmitted from a microwave generator such as a radar gun which is a device for measuring the running speed of cars.

2. Description of the Related Art

Radar detectors detect microwave signals from a traffic radar, sound an alert, and inform the driver of the strength of the microwave signals and sometimes location of the radar source. Most radar detectors will identify the three common microwave frequencies employed in traffic radars:

X Band: 10.525+/−0.025 GHZ

K Band: 24.150+/−0.100 GHZ

Ka Band: 34.700+/−1.300 GHZ

FIG. 20 indicates a conventional receiving circuit of a radar detector. Micro-strip line 11 connects mixer 51 to an antenna which is not indicated in FIG. 20. Dielectric resonators (DR) 31,32,33 in Dielectric resonator oscillators (DRO) 1,2,3 have a direct electromagnetic coupling to line 11 respectively, with the output of DRO 1,2,3 being supplied to mixer 51. DRO 1,2,3 include field effect transistors (FET) 41,42,43 as amplifying elements, and lines 15,16,17, the outputs of which are coupled to DR 31,32, 33electromagnetically and generate signals which create different frequencies f0,f1,f2 respectively. Filters 21,22,23 function as band rejection filters, are open stub, and therefore have $\lambda/4$ wavelength at frequencies that correspond to those of DROs respectively, and thus prevent the outputs of DROs 31,32,33 to propagate to the antenna.

However, utilizing DROs creates two problems, of which first is the increasing cost of the radar detector. The second is that the DROs type detector receives undesired signals because DROs inherently requires a wide intermediate frequency range, and thus have an increasing false alarm rate.

Utilizing one VCO as the 1st local oscillator invalidates the familiar method. One possible way is the one achieving a VCO circuit such oscilates over a vast frequency range, which enables each RX band can use a different 1st local frequency range without overlapping. If this work is done, we can treat the method being equivalent to that of DROs. However, such the VCO is not achievable due to the semiconductor performance in our time. Thus a narrow oscillation frequency range is preferable regardless some additional criteria may be required.

SUMMARY OF THE INVENTION

The present invention functions to solve the problems above, and aims to provide a radar detector which is comprised of a voltage controlling oscillator (VCO) instead of DROs, thereby decreasing the cost of radar detector.

The present invention aims to provide a radar detector which can decrease the false alarm rate.

The radar detector according to the present invention comprises an antenna for receiving a radar signal; a voltage controlled oscillator which receives a control signal and generates a signal of a frequency corresponding thereto; a first mixer in which said radar signal is mixed with the output signal of said voltage controlled oscillator; plurality of local oscillators which generate signals with frequencies that are different each other; a second mixer in which the output signal of said first mixer is mixed with one of the output signals of said plurality of local oscillators; a detector which detects said radar signals on the basis of the output of said second mixer; a sweep signal generating section which generates and supplies a sweep signal to said voltage controlled oscillator as said control signal; a memory section which stores pair combination data indicating the relation between the frequency of said voltage controlled oscillator, the frequencies of said local oscillators and the frequency of the received radar signal in advance; and a controlling section which obtains information regarding the frequency of said voltage controlled oscillator and the frequency of said one of the local oscillator from which the output is input to said second mixer when said detector detects a radar signal and decides the frequency of said radar signal by comparing the obtained information with said pair combination data in said memory section.

The radar detector according to the present invention comprises an antenna for receiving radar signals; a receiving section which demodulates the radar signal received by said antenna based on output signals of local oscillators; and a controlling section which, after detecting a radar signal demodulated by said receiving section, decides the received frequency of said radar signal and counts the number of detected signals during a receiving sequence, which is used to recognize the environment of straying signals, and generates an alarm signal on the basis of said number.

The radar detector according to the present invention comprises an antenna for receiving radar signals; a receiving section which demodulates the radar signal received by said antenna based on output signals of local oscillators; a controlling section which, after detecting a radar signal demodulated by said receiving section, decides the received frequency of said radar signal; and a filter circuit at a demodulation port, which reduces demodulated noise for X band and K band and lowers the threshold level so as to maximize sensitivity.

The microwave receiving circuit according to the present invention comprises a first local oscillator which generates a first local signal; a first mixer in which a input signal is mixed with the output signal from said first local oscillator and a signal of a frequency of the difference between the frequencies of the mixed signals is output therefrom; a second local oscillator which generates a second local signal; a second mixer in which a output signal from said first mixer is mixed with the output signal from said second local oscillator and a signal of a frequency of the difference between the frequencies of the mixed signals is output therefrom; and a controlling section which sweeps frequency of said first local oscillator so as to obtain a first receiving result when said second local oscillator oscillates at a first frequency and sweeps frequency of said first local oscillator so as to obtain a second receiving result when said second local oscillator oscillators at a second frequency and decides the frequency of said input signal on the basis of said first receiving result and said second receiving result.

BRIEF DESCRIPTION OF THE DRAWINGS

FIGS. 4 and 4A are a programmed table for Ka band when the external mix bias=off.

FIGS. 5 and 5A are a programmed table for Ka band when the external mix bias=off (continued).

FIGS. 6 and 6A are a programmed table for Ka band when the external mix bias=off (continued).

FIGS. 7 and 7A are a programmed table for X band and K band when the external mix bias=on.

FIGS. 8 and 8A are a programmed table for X band and K band when the external mix bias=on (continued).

FIGS. 9 and 9A are a programmed table for X band and K band when the external mix bias=on (continued).

FIGS. 11(a) and 11(b) indicate programmed pair combinations of K band and X band.

DESCRIPTION OF THE PREFERRED EMBODIMENTS

A radar detector according to an embodiment of the present invention will be explained by reference to the drawings.

Figure 1:
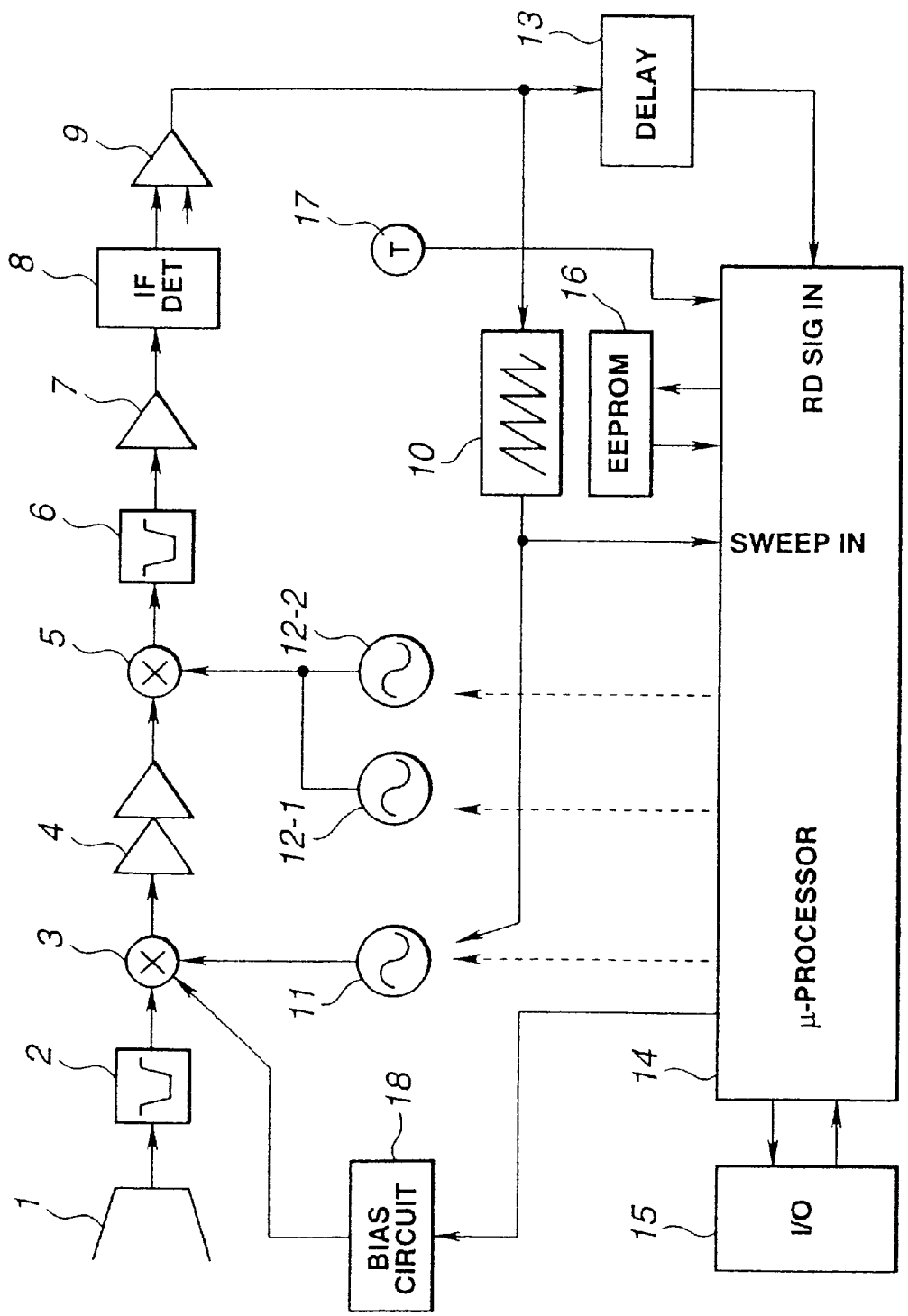
FIG. 1 is a block diagram of the radar detector according to an embodiment of the present invention.

FIG. 1 is a block diagram of the functions of the device according to an embodiment of the present invention.

The high frequency signal from a radar gun (not illustrated) received by the antenna (ANT) 1 is input into mixer (MIX) 3 after removing signals of a predetermined band via band rejection filter (BRF) 2. At mixer 3, the received high frequency signal is mixed with the output signal of a first local voltage controlling 25 oscillators (VCO) 11 and a signal is output which has a frequency of the difference of the frequencies of the mixed signals (first intermediate frequency signal). The output signal of mixer 3 is amplified by intermediate frequency amplifier (IFA) 4, and input to mixer 5. At mixer 5, the intermediate frequency signal output from mixer 3 is mixed with the output signal from one of second local oscillators (OSC) 12-1~12-2, and a signal is output which has a frequency of the difference of the frequencies of the mixed signals (second intermediate frequency signal). Only the signal of a desired frequency band is taken out via band pass filter (BPF) 6 from the output of mixer 5, which is then amplified via amplifier (AMP) 7, and then input into FM detector (FMDET) 8. The output from FM detector 8 is compared with a predetermined threshold value to judge the existence of a received signal via comparator (COMP) 9, and only a signal from this threshold value upwards is output. The output from comparator 9 is input into saw wave generator 10 and delay means 13. Saw wave generator 10 generates a saw wave signal at predetermined intervals, and supplies it to VCO 11. This saw wave signal becomes the frequency sweep signal of the radar detector. Furthermore, when receiving a detected signal from comparator 9, saw wave generator 10 temporarily stops the voltage sweep.

The output from saw wave generator 10 and that of delay means 13 are input respectively in the Sweep in terminal (e.g. the A/D port of a micro-processor for converting analog values to digital values) and the RD Sig in terminal (e.g. the input port of the micro-processor) of the controlling microprocessor 14. micor-processor 14 controls first local voltage controlling oscillator 11 and selects one of second local oscillators 12-1, 12-2 based on the output of saw wave generator 10, the output of delay means 13, the data of EEPROM 16 wherein the relation between the voltage of the sweep signal to be supplied to VCO 11 and the oscillation frequency is stored in advance for VCO 11, and the output signals of temperature sensor 17 such as a thermocouple, a thermistor, or a semiconductor sensor, etc., and calculates and outputs the detected results to input/output section (I/O) 15. Furthermore, micro-processor 14 receives controlling signals, etc. from input/output section 15.

As the 1st local oscillator, DROs we have used as a matter of course are replaced by one VCO circuit. Corresponding with this change, the criteria for discriminating RX band became quite new.

The familiar criteria is by mean of recognizing which DRO has been activated at which moment of detecting police radar signal, since DRO is provided individually to each RX band. Contrary, using one VCO requires a new method as this individuality is lost.

In this embodiment, the method is based on the mathematical relationship among the local frequencies at the time of detecting signal.

1. Principle of Discriminating Receiving Band

As the 1st local oscillator, DROs we have used as a matter of course are replaced by one VCO circuit. Corresponding with this change, the criteria for discriminating RX band became quite new.

The familiar criteria is by mean of recognizing which DRO has been activated at which moment of detecting police radar signal, since DRO is provided individually to each RX band. Contrary, using one VCO requires a new method as this individuality is lost.

In this embodiment, the method is based on the mathematical relationship among the local frequencies at the time of detecting signal.

Utilizing one VCO as the 1st local oscillator invalidates the familiar method as described above. One possible way is the one achieving a VCO circuit such oscillates over a vast frequency range, which enables each RX band can use a different 1st local frequency range without overlapping. If this work is done, we can treat the method being equivalent to that of DROs however, such the VCO is not achievable due to the semiconductor performance in our time. Thus a narrow oscillation frequency range is preferable regardless some additional criteria may be required. As the criteria, following two methods are mainly employed;

1) Providing two (2) 2nd oscillators oscillating at the different frequency each other. The frequencies are fixed to predetermined values respectively.

2) Monitoring the 1st local frequency whenever detecting incoming signals.

The frequency of the received signals can be calculated from the local frequencies at the time of signal detection. For convenience, we call two (2) each 2nd oscillators as 2nd Lo($\alpha$) and 2nd Lo($\beta$), then clearly;

3) Freq(RX)=n*Freq1(1st Lo)+/−1*Freq(2nd Lo($\alpha$))
4) Freq(RX)=n*Freq2(1st Lo)+/−1*Freq(2nd Lo($\beta$))

where

5) Freq(RX): Incoming signal frequency (not only police radar signal)
6) Freq1(1st Lo): 1st local oscillation frequency at time of detecting Freq(RX)
7) Freq2(1st Lo): 1st local oscillation frequency at time of detecting Freq(RX)
8) Freq(2nd Lo($\alpha$)): 2nd Lo($\alpha$) oscillation frequency—fixed
9) Freq(2nd Lo($\beta$)): 2nd Lo($\beta$) oscillation frequency—fixed
10) Freq(2nd Lo($\alpha$))≈Freq(2nd LO($\beta$))

For police radar signals, 11) n=1 for X band
12) n=2 for K band
13) n=3 for Ka band We note that a) we assume the "n" to simplify the explanation, but we do not employ any circuit such can identify the actual value of "n" and b) the RD unit never have a function like a frequency counter for calculating the 1st local oscillation frequency.

Instead, the micro-processor samples the voltage across VCO's varactor diode, which has the obvious relationship between the VCO frequency and voltage.

We explain more detailed concept. In general, VCO oscillation frequency becomes higher as increasing reverse voltage across a varactor diode. This relationship is one of the most important factor to describe VCO characteristics. If we have the actual characteristics data, the 1st local oscillation frequency is relevantly perceptible once the reverse voltages are given. So, the 1st local oscillating frequency Freq(1st Lo) can be obtained by simply monitoring the varactor voltage even if without a frequency counter.

The actual VCO characteristics depends on tolerances of components as well as a circuit design. Thus these tolerances constrain the characteristics, which changes unit by unit.

Because of this inescapable tolerances, every actual units has to have the characteristics of its own VCO data in a memory device. This data should hopefully exhibit the exact graphed data of which are taken on engineering duty, but this will exhaust the memory area. For saving the memory area, the following method is used to approximate the VCO characteristics.

Figure 3:
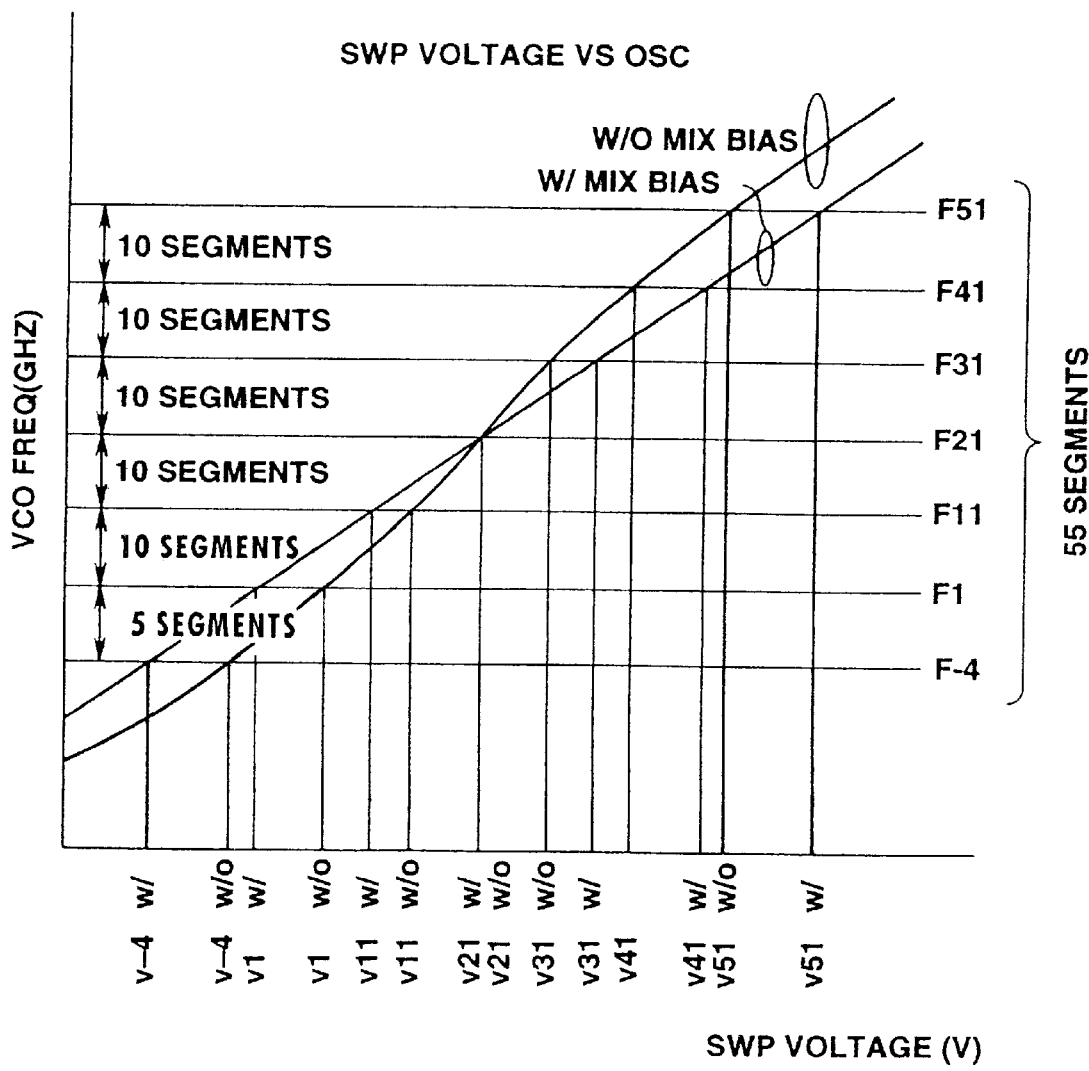
FIG. 3 is a graph of relationship between sweep voltage and VCO frequency according to an embodiment of the present invention.

In this model, the seven varactor voltages giving each seven predetermined 1st local frequency as shown in FIG. 3 are written to an unit's EEPROM through an external jig. During the EEPROM writing procedure, an operator vary the varactor voltage while monitoring the 1st local oscillation frequency on an external frequency counter, then stop adjusting the voltage if the frequency reaches to the desired frequency and gives OK to the jig. Then the jig measures the varactor voltages with converting them into HEX data and go writing data to the EEPROM. This procedure is repeated seven times to each seven frequencies. Moreover, since the oscillation frequency changes by 1st mixer biasing condition, above procedures is done under with and without applying the external mixer bias. Each seven (times 2) voltage data represents VCO characteristics as shown in FIG. 3.

The micro-processor reads out these 7−2=14 voltage data from the EEPROM and mathematically divides them into further 55 segment voltages. The calculated 55 voltages are used to approximate VCO characteristics more accurate than based on only seven voltages.

Note that the divided segment voltages take discrete values.

This voltage discontinuity between the adjacent segments becomes the minimum resolution for determining 1st local frequency Freq(1st Lo), which is around 13.4MHZ on a fundamental oscillation frequency basis.

The micro-processor is programmed to assign the particular segment numbers "N" to each 55 segment voltages, which represent the segment voltages. We call this representational number as "segment number". Thus the assigned segment number equivalently coincides to the 1st local oscillation frequency.

14) segment number N1≙Freq1(1stLo)
15) segment number N2≙Freq2(1stLo)

The micro-processor samples the applied varactor voltage at its A/D port at time of detecting incoming signals. Thus we can recognize the 1st local frequency coincides to every incoming signals by comparing the sampled voltage and stored 55 "segment numbers".

When we receive a police radar signal, the detected segment number is relevant to the signal frequency Freq (RX) by obtaining "n".

Again, we rewrite the equation 3) and 4) as;

| | |
|---|---|
| 16) | Freq(RX1) =n*Freq1(1st Lo) + Freq(2nd Lo($\alpha$)) |
| | =n*Freq2(1st Lo) + Freq(2nd Lo($\beta$)) |
| 17) | Freq(RX1) =n*Freq1(1st Lo) + Freq(2nd Lo($\alpha$)) |
| | =n*Freq2(1st Lo) − Freq(2nd Lo($\beta$)) |
| 18) | Freq(RX1) =n*Freq2(1st Lo) − Freq(2nd Lo($\alpha$)) |
| | =n*Freq2(1st Lo) + Freq(2nd Lo($\beta$)) |
| 19) | Freq(RX1) =n*Freq2(1st Lo) − Freq(2nd Lo($\alpha$)) |
| | =n*Freq2(1st Lo) − Freq(2nd Lo($\beta$)) |

Thus "n" taking the reasonable value can be calculated through 16') to 19').

| | |
|---|---|
| 16') | n = \| Freq(2nd Lo($\beta$))−Freq(2nd Lo($\alpha$)) \| |
| | + \| Freq1(1st Lo)−Freq2(1st Lo) \| |
| 17') | n = \| −Freq(2nd Lo($\beta$))−Freq(2nd Lo($\alpha$))\| |
| | + \| Freq1(1st Lo)−Freq2(1st Lo) \| |
| 18') | n = \| Freq(2nd Lo($\beta$))+Freq(2nd Lo($\alpha$))\| |
| | + \| Freq1(1st Lo)−Freq2(1st Lo) \| |
| 19') | n = \| −Freq(2nd Lo($\beta$))+Freq(2nd Lo($\alpha$))\| |
| | + \| Freq1(1st Lo)−Freq2(1st Lo) \| |

Where

Freq1(1st Lo) and Freq2(1st Lo) are held as N1 and N2 in the micro-processor;

20) N1≙Freq1(1st Lo)≈N2≙Freq2(1st Lo)

Freq(2nd Lo($\alpha$)) and Freq(2nd Lo($\beta$)) take the predetermined value and;

21) Freq(2nd Lo($\alpha$))≈Freq(2nd Lo($\beta$))

Now we see the incoming frequency can be clearly obtained from N1, N2 and fixed-2nd local frequency.

Now take note that we always have two different segment numbers per one incoming signal as expressed in equation 20). These two different segment numbers creates a pair of two segment numbers, and we call this pair as "pair combination".

22) Freq(RX1) creates the "pair combination": (N1,N2)

The micro-processor has the programmed table for each bands, which describe all the possible pair combinations based on the police frequencies. The unit performs beep alert only when a detected pair combination satisfied the programmed condition.

Thus, instead of calculating the frequency, the microprocessor holds the segment numbers (N) so as to identify the incoming frequencies;

Na: when the 2nd Lo(α) ON and mix bias OFF
Nb: when the 2nd Lo(β) ON and mix bias OFF
Nc: when the 2nd Lo(α) ON and mix bias ON
Nd: when the 2nd Lo(β) ON and mix bias ON 2. Detail Description of Discriminating Receiving Band Receiving sequence according to this embodiment of the present invention will be explained by reference to a flow-chart shown in FIG. 2.

The micro-processor 14 switches the 2nd local oscillators 12-1,12-2 and mixer biasing circuit 18 on the sweep period basis. The voltage applied to varactor diode sweeps continuously from 0V to 10V with the sawtooth waveform. We call this waveform as "sweep waveform" and the voltage as "sweep voltage". The sequence repeats the following step a)~d) according to STEP 1 to STEP 4 of FIG. 2.

TABLE 1-A (Receiving Sequence)

| VCO | Mix Bias | 2nd Local 0.6G | 2nd Local 1.36G | RX Band |
|---|---|---|---|---|
| a) 0~10V | ON | ON | OFF | K |
| b) 0~10V | ON | OFF | ON | X and K |
| c) 0~10V | OFF | ON | OFF | Ka |
| d) 0~10V | OFF | OFF | ON | Ka |

We note that the external biasing for the 1st mixer is applied for the both the X and K band. As seen from the following table, X-band should be received during the only one sequence b). The concept of the pair combination is not applied on X-band.

As a further explanation, the certain frequency range (around from 34.8 to 35.3 GHZ) in Ka-band should be received twice by the same 2nd local oscillator (0.6 GHz), which is produced by the upper and lower side mixing. In this case, the pair combination concept is still applicable.

Figure 2:
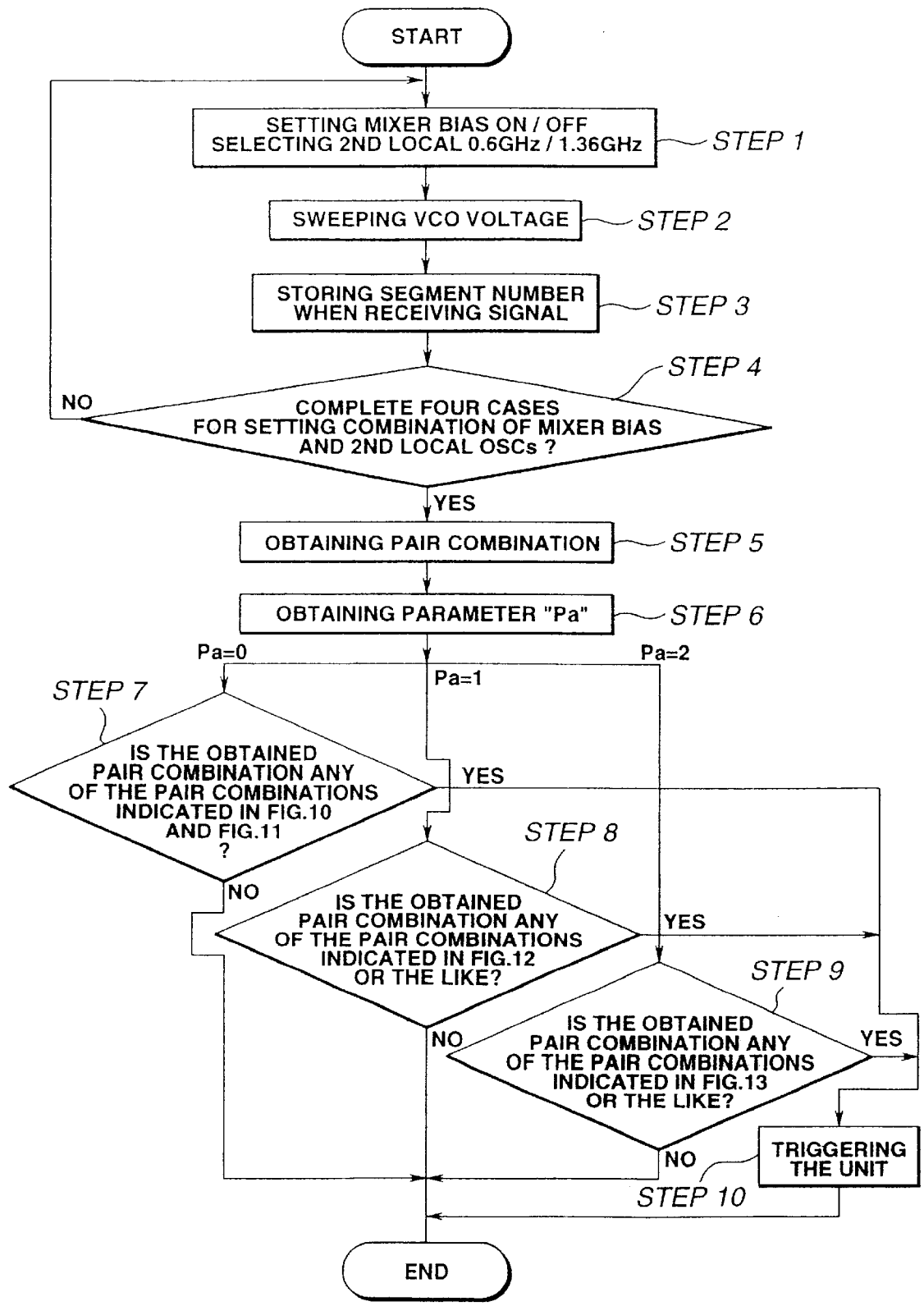
FIG. 2 is a flow chart of the radar detector operations according to an embodiment of the present invention.

A pair combination is obtained through the receiving sequence according to STEP 5 of FIG. 2.

As described, one incoming signal should coincide to only one pair combination having two different segment numbers. The unit can identify the incoming frequency within the minimum resolution of 1st local frequency, and can minimize the false alert to straying signals.

However, if we consider tolerances expected in the actual unit, we need the method more for compensating the tolerances.

When dividing the seven voltage data into 55 segment voltages, the micro-processor produces a reminder bit due to its digital processing.

The micro-processor inserts the remainder bit to the segments (STEP 6 of FIG. 2). Thus the equivalent 1st local frequency width of each segment will not be same. This reminder bit limits the accuracy between the segment number and 1st local frequency.

To compensate these errors, the parameter (Pa) is provided in the EEPROM to moderate the pair combinations.

Referring to tables shown in FIG. 4 to FIG. 9, which are the programmed table explained above, and FIG. 10 to FIG. 11 which show the programmed pair combinations with the segment numbers, a sequence for determining frequency of receiving signal will be explained.

There are six (6) tables having ten rows in FIG. 4 to FIG. 9. Each tables shows the numerical relationships among the 1st local frequency, 2nd local frequency and police radar frequency.

The most upper rows exhibit the segment numbers explained in the previous section. The filled police radar frequencies in the 3rd~10th row are of the maximum threshold in each segment.

If you look at the table from left to right, you can see the segment number increase coincides with the increase of 1st local frequency in the 2nd row.

The highlighted segment numbers in FIG. 4 to FIG. 9 are of the 1st local frequencies to be written through EEPROM writing jig. The written data become the seven voltage data representing VCO 11 characteristics. Note that except the segment "−4", all the highlighted segments are separated by 9 segments. This equally separation gives intuition that each segment has the same frequency width of 1st local under ideal conditions.

We note that a) the 1st IF frequency exhibited in FIG. 4 to FIG. 9 can coincide to 2nd local frequency, since the 2nd IF (10.7 MHZ) is negligible in the 1st IF frequency range and b) although the segment number −4~1 is separated by only 4 segments, the micro-processor is programmed so that each segment to have the same 1st local frequency width as same as other segments.

Figure 10:
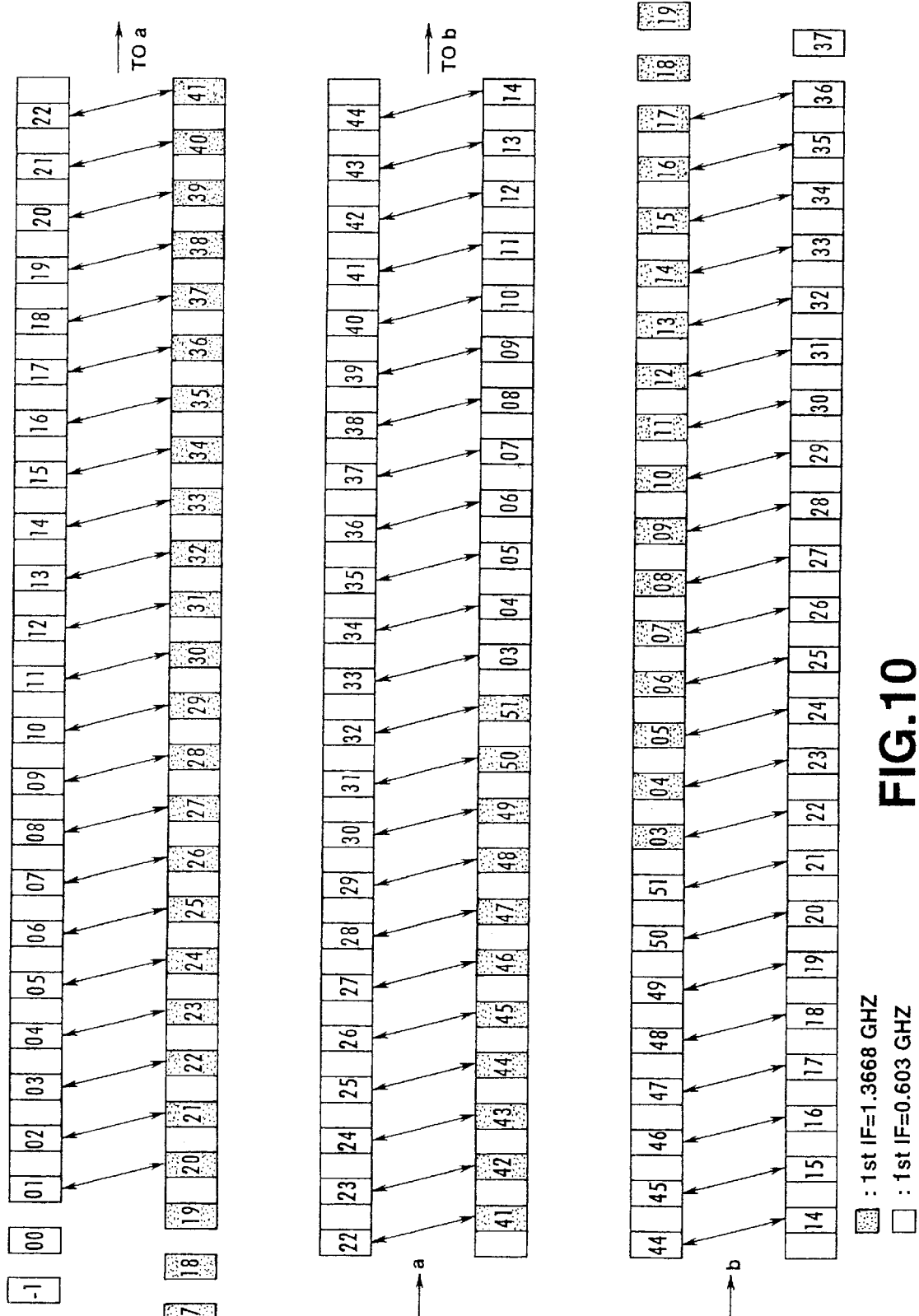
FIG. 10 indicates programmed pair combinations of Ka band.

The FIG. 10 to FIG. 11(*b*) show the programmed pair combinations with the segment numbers. The arrows are used to indicate pairs of segment numbers exhibiting the combination.

There are three pair combination tables for each receiving band Ka, K and X.

STEP 7: Determining Frequency of Receiving Signal when Pa=0

When we receive 35.000 GHZ police radar signal with Pa=0;

a) In FIG. 4, you will find the frequency 35.025 GHZ in the 9th row and its segment number is "13". Take note that the filled police radar frequency exhibits the maximum threshold frequency in the segment. The receiving frequency with the segment "12" is 4.9848 GHZ, thus the segment "13" can receive from 34.9848 to 5.025 GHZ. The 9th row group the Ka receiving frequency, which should be detected by 0.6 G of the 2nd local oscillator.

b) In FIG. 6, also the same frequency can be found with the segment number "43". Thus the segment numbers "13" and "43" make a pair combination.

c) Next in FIG. 10, you can find the segment number "13" and "43" being connected by a double head arrow.

d) When the parameter Pa is set to "0", the unit should be triggered only by the pair combination consisting of "13" and "43" to 35.000 GHZ.

STEP 8: Determining Frequency of Receiving Signal when Pa=1

When the parameter Pa is not equals to "0", the pair combinations triggering the unit to alert can be moderated.

If you choose "1" as Pa, which permits three adjacent segment numbers to make the pair combination with the partner number.

Figure 12:
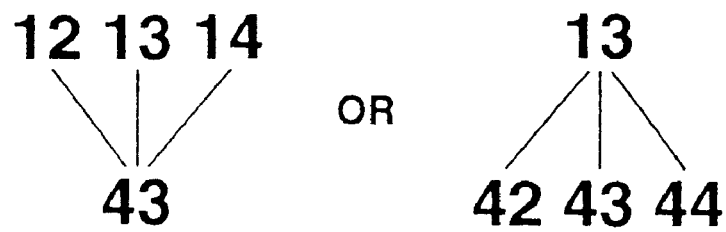
FIG. 12 indicates pair combinations for triggering the unit when parameter "Pa"=1.

When you receive 35.000 GHZ;

Performing Step a) to c) described in STEP 7.

d) When the parameter Pa is set to "1", any of the following pair combinations can trigger the unit. These pair combinations are also shown in FIG. 12.

"13" & "43"
"13" & "42"
"13" & "44"
"12" & "43"
"14" & "43"

Micro-processor 14 searches programmed pair combinations shown in FIG. 10 to FIG. 11(*b*) and selects one of pair combinations described above. Frequency of receiving signal is determined based on the pair combination.

STEP 9: Determining Frequency of Receiving Signal when Pa=2

Figure 13:
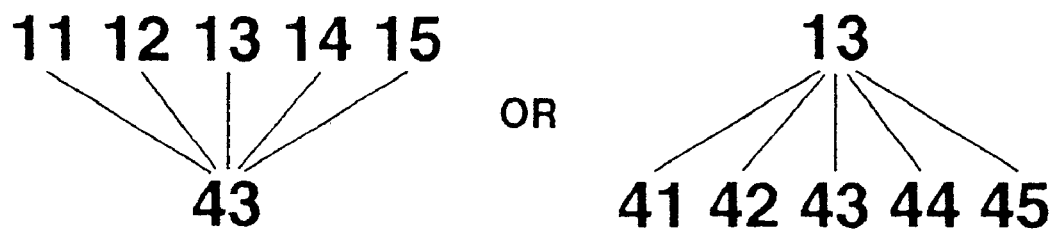
FIG. 13 indicates pair combinations for triggering the unit when parameter "Pa"=2.
Figure 14:
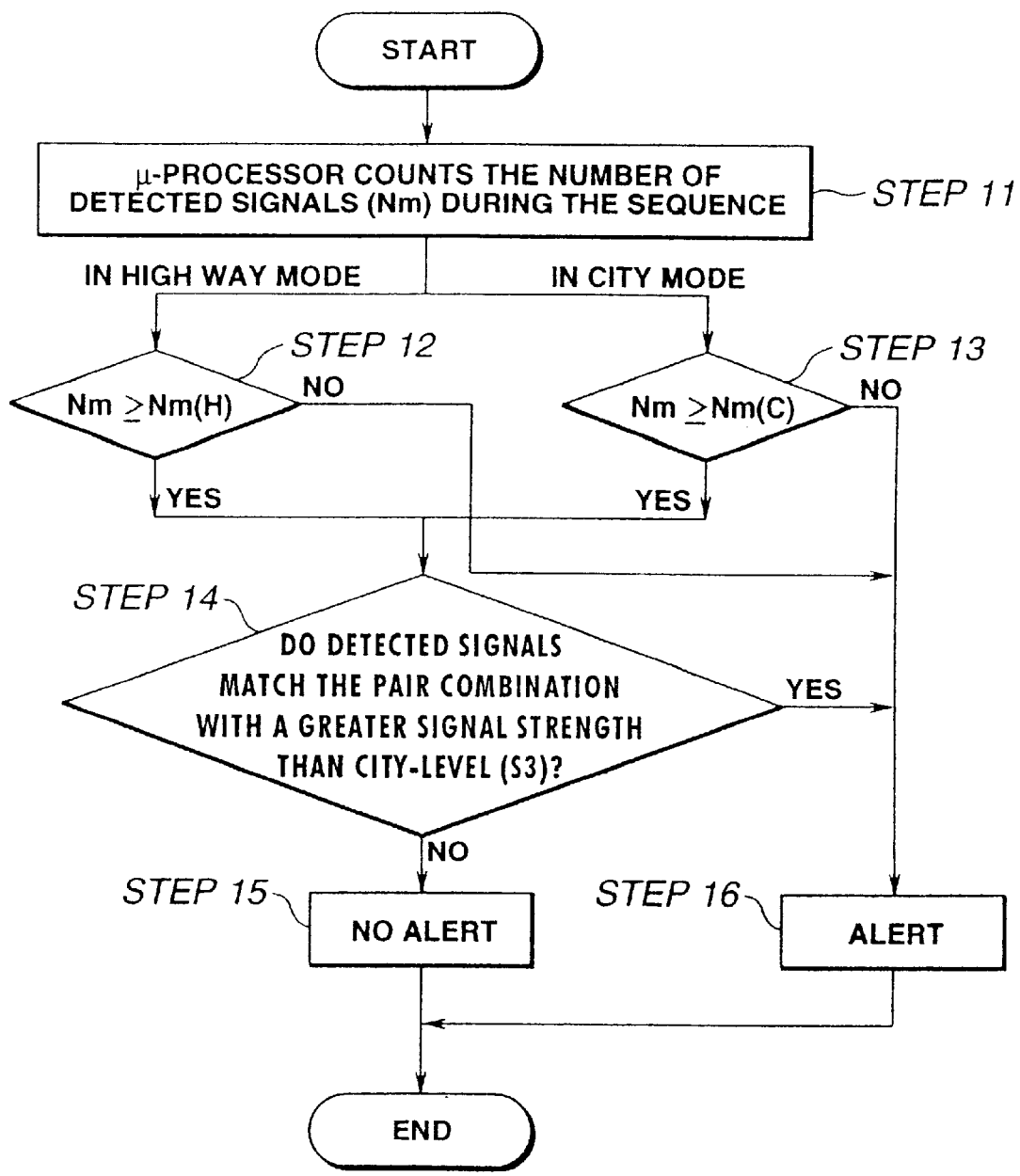
FIG. 14 is a flow chart of the radar detector's operations for reducing false alert readings according to an embodiment of the present invention.
Figure 15:
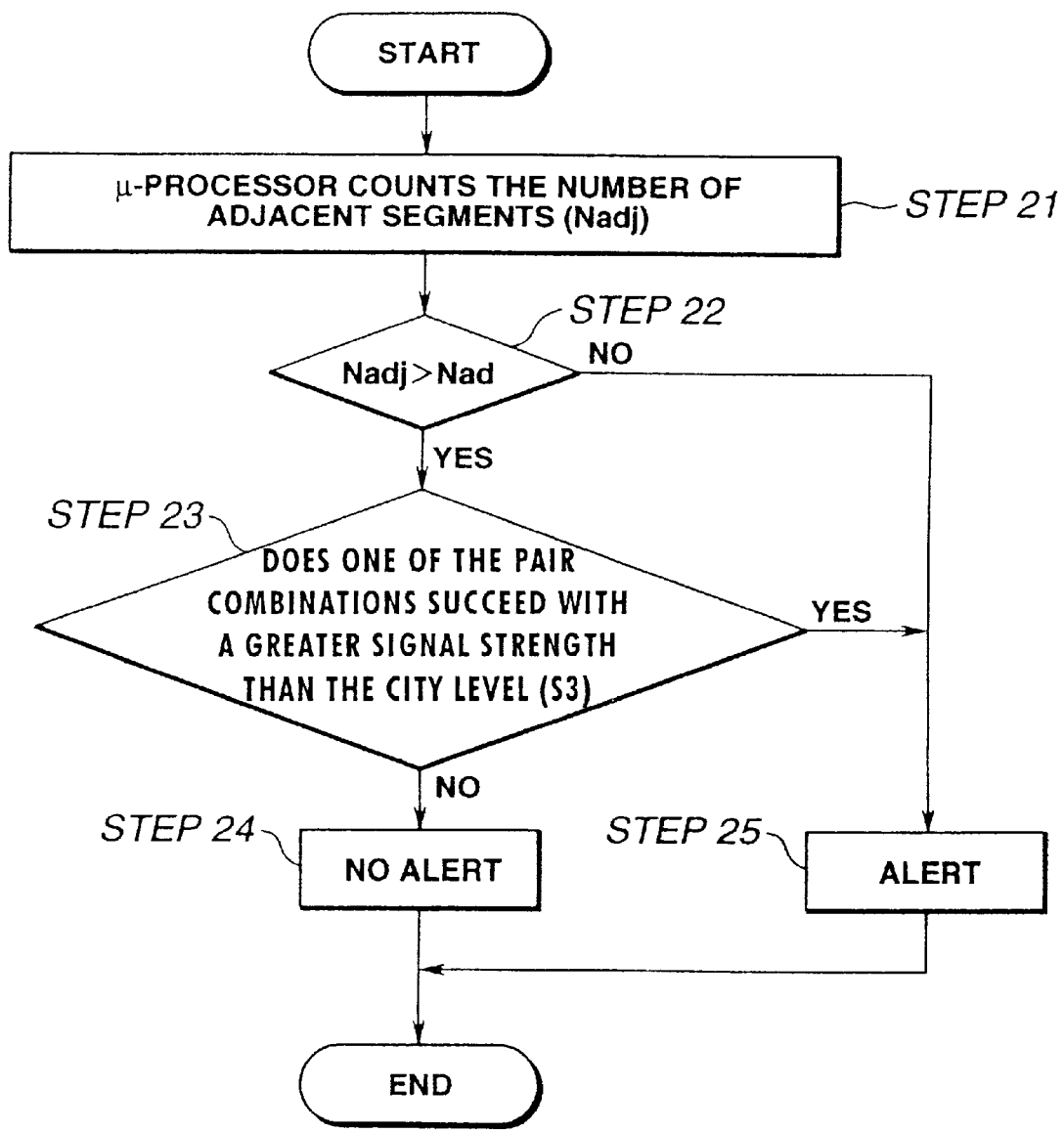
FIG. 15 is a flow chart of the radar detector's operations for reducing false alert readings according to an embodiment of the present invention.

Similarly, the "2" works as;

When you receive 35.000 GHZ;

Performing Step a) to c) described in STEP 7.

d) When the parameter Pa is set to "2", any of the following pair combinations can trigger the unit. These pair combinations are also shown in FIG. 13.

"13" & "41"
"13" & "42"
"13" & "43"
"13" & "44"
"13" & "45"
"11" & "43"
"12" & "43"
"14" & "43"
"15" & "43"

Frequency of receiving signal is determined based on one of pair combinations.

3. Reducing False Alert

The false alert response of this embodiment of the present invention differs from that of prior art.

(1)-a) Counting Detected signals −1

As seen from Table 1-A described above, the time frame consisting of four steps becomes the minimum period to detect signals on each band, which is called "sequence".

One sequence through a) to d) in the Table 1-A should take four times of the sweep period.

At every end of the sequence, the micro-processor 14 counts the number of detected signals during the sequence. As easily imagine, the counted number will increase where many straying signals exist.

The 2nd local oscillators and mixer bias conditions are not distinctive for counting detected signals.

Thus environmental condition (e.g. a city area where many straying signals exist) can be perceived via the number of counted signals. The control section controls the alarm signal based on the number of counted signals (Nm) and programmable value (Nm(H) and Nm(C)) in the EEPROM. The parameter Nm(H) and Nm(C) functions as below;

1) In Highway Mode

When $Nm \geq Nm(H)$, the unit does not alert even if the detected signals match the pair combination.

2) In City Mode

When $Nm \geq Nm(C)$, the unit does not alert even if the detected signals match the pair condition.

When the detected signals matches the pair combination with the greater signal strength than city-level (S3), the unit goes to alert nothing to do with Nm.

The number Nm can be select by writing to EEPROM in HEX.

We note that a) City-Mode does not reduce the maximum sensitivity.

(1)-b) Counting Detected signals −2

Since the microwave communication system generally uses the modulated frequency occupying over several ten MHZ, the micro-processor holds the number of occupied adjacent segments (Nadj) as well as counting signals for false protection against modulated signals.

The number of adjacent segments (Nad) prohibiting alert is written in EEPROM. Note that the unit performs alert nothing to do with this parameter whenever if one of the pair combination succeed with the greater signal strength than city level (S3).

4. Filter

The filter circuit at demodulation port is modified to maximize the sensitivity. The circuit is shown in FIG. 16.

During the sequence of X and K band, the external mixer bias voltage is applied as described in above. By utilizing this voltage, the capacitor of the filter is conducted during this sequence.

When the external mixer bias voltage, being controlled by the micro-processor 14, is applied at the port "E" as indicated in the schematic, C10 will be conducted to the ground via Q15. Thus the filter is formed by component r (internal resister in IC1), C12,R7 and C10.

Figure 16:
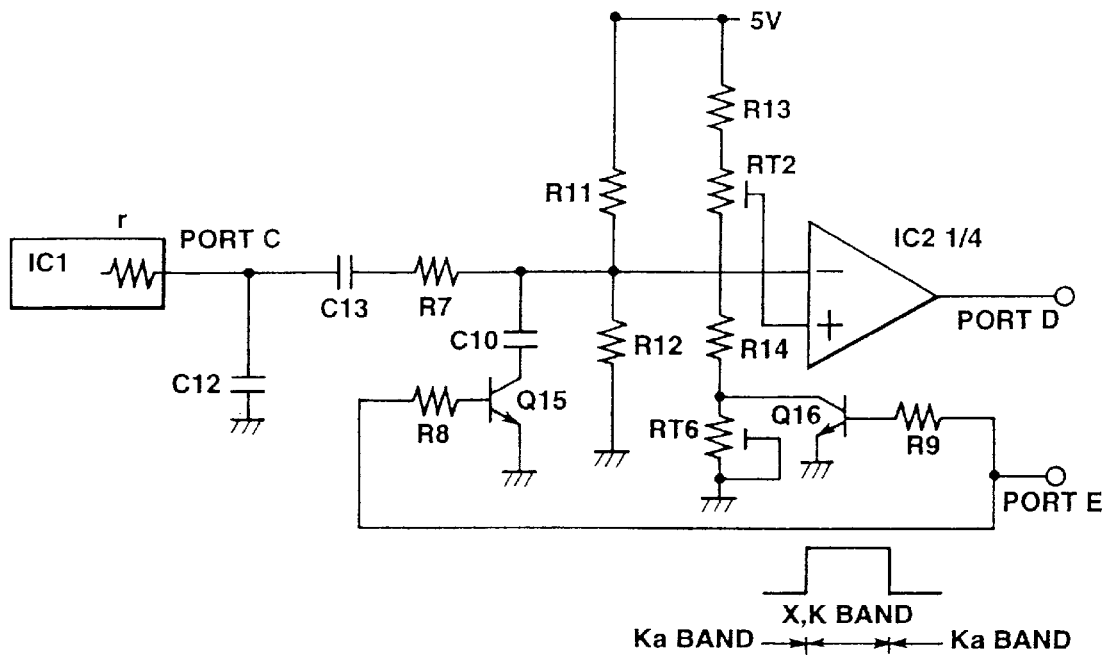
FIG. 16 is a schematic diagram of the filter circuit according to an embodiment of the present invention.
Figure 17:
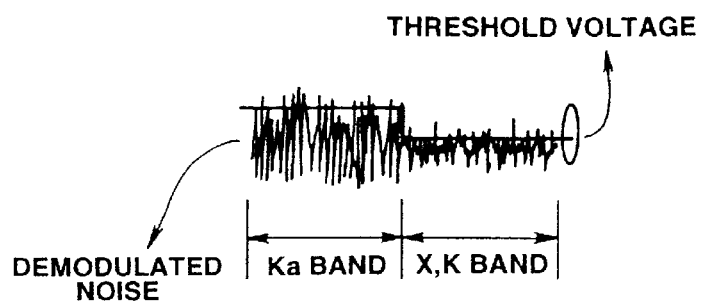
FIG. 17 indicates a example waveform of the demodulated noise according to an embodiment of the present invention.

This additional capacitance reduces the demodulated noise at the port "C" as shown in FIG. 16.

The reduction of the peak voltage of the noise enable to lower the threshold voltage (IC2), which leads to good sensitivity. The probability to detect signals will increase with decrease of the threshold voltage.

During Ka band receiving period, C10 is left open since no voltage is applied at the port "E". In this case, r and C12 consists filter circuit.

To control the threshold voltage, RT6 and Q16 are provided. When applying the external mixer voltage, RT6 will be shorted via Q16 to lower the threshold voltage (IC2).

By controlling the capacitance of the filter, the sensitivity can be optimized on every bands.

The filter circuit can be employed by a LCR filter, an active filter or the like as well as a passive RC filter which is indicated in FIG. 16. It is possible to select the band width of the filter, which is set each band containing receiving signals, and receive signals.

5. LPF

In general, the oscillation frequency stability of VCO is considerable lower than that of DRO.

This characteristics are due to the "Q" factor of the resonant devise used in the oscillator circuit.

The low "Q" factor means that the oscillation frequency tends to fluctuate stochastically.

This nature makes the demodulated signal fluctuating, which may degrade the maximum sensitivity.

Figure 18:
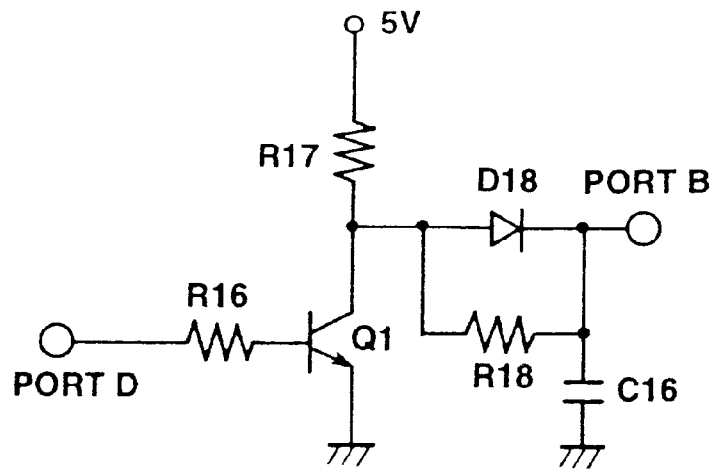
FIG. 18 is a schematic diagram of the low pass filter (LPF) according to an embodiment of the present invention.

To prevent degradation of the maximum sensitivity, the LPF circuit has been provided as shown in FIG. 18.

When receiving signal, the negative going pulse is fed to the input port "A". Then the output voltage at the port "B" rises with the time constant being determined by R17 and C16.

Figure 19:
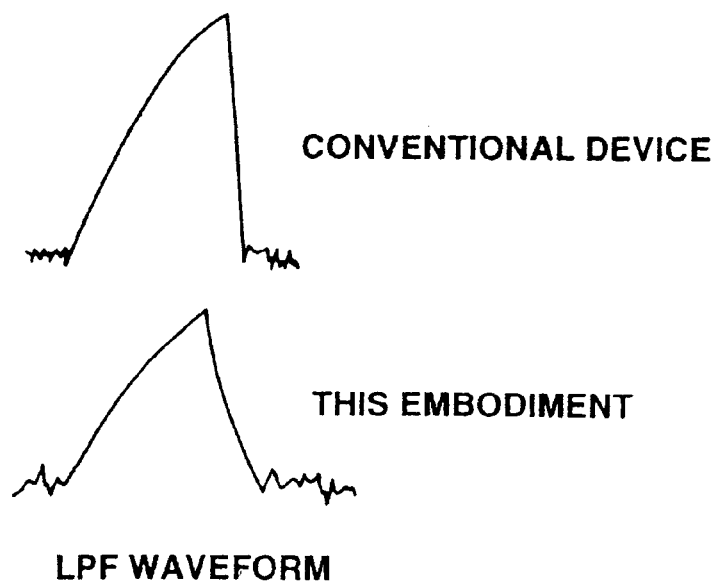
FIG. 19 indicates a example of the output waveform of the LPF according to an embodiment of the present invention.
Figure 20:
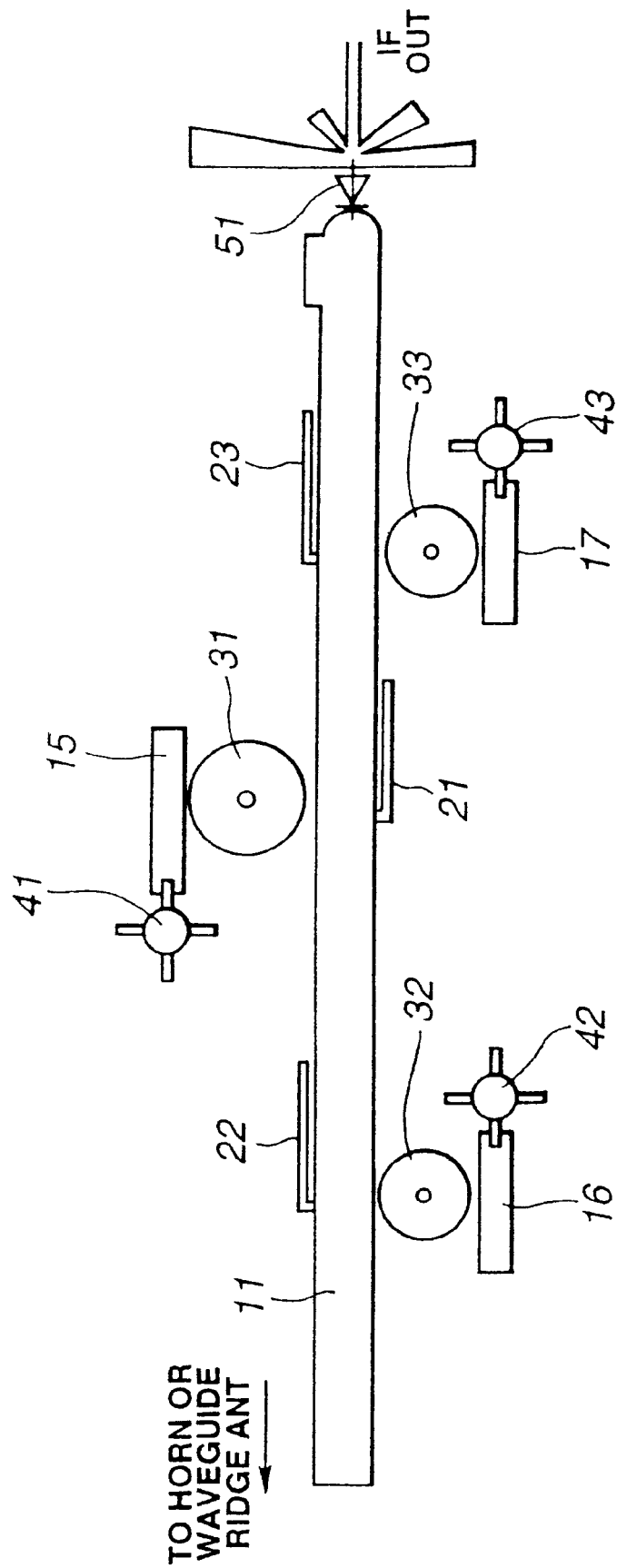
FIG. 20 indicates the structure of the conventional radar detector.

When the signal disappeared, the output voltage at the port "B" drops with the time constant determined by R17, R18 and C16. This extended falling time helps to keep the sensitivity when the received signal stochastically disappeared due to VCO fluctuation. The waveforms are shown in FIG. 19.

What is claimed is:

1. A radar detector comprising:

an antenna for receiving a radar signal;

a voltage controlled oscillator which receives a control signal and generates a signal of a frequency corresponding thereto;

a first mixer in which said radar signal is mixed with the output signal of said voltage controlled oscillator;

plurality of local oscillators which generate signals with frequencies that are different each other;

a second mixer in which the output signal of said first mixer is mixed with one of the output signals of said plurality of local oscillators;

a detector which detects said radar signals on the basis of the output of said second mixer;

a sweep signal generating section which generates and supplies a sweep signal to said voltage controlled oscillator as said control signal;

a memory section which stores pair combination data indicating the relation between the frequency of said voltage controlled oscillator, the frequencies of said local oscillators and the frequency of the received radar signal in advance; and a controlling section which obtains information regarding the frequency of said voltage controlled oscillator and the frequency of said one of the local oscillator from which the output is input to said second mixer when said detector detects a radar signal and decides the frequency of said radar signal by comparing the obtained information with said pair combination data in said memory section.

2. The radar detector according to claim 1, further comprising a bias circuit which supplies a bias voltage to said first mixer.

3. The radar detector according to claim 2, wherein said controlling section controls said bias circuit to supply said bias voltage to said first mixer for detecting a Ka band radar signal.

4. The radar detector according to claim 2, wherein said controlling section controls said bias circuit and does not supply said bias voltage to said first mixer for detecting X band and K band radar signal.

5. The radar detector according to claim 1, wherein said pair combination data of said memory section includes a combination of a first segment number and a second segment number, which correspond to frequencies of said voltage controlled oscillator when said detector detects said radar signal under different conditions of local oscillators and bias ON/OFF.

6. The radar detector according to claim 5, wherein said controlling section sets a parameter Pa for moderating said pair combination data, which is determined corresponding to accuracy between the segment number and said voltage controlled oscillator, and decides the frequency of said radar signal on the basis of said parameter Pa.

7. The radar detector according to claim 6, wherein said controlling section decides the frequency of said radar signal on the basis of said pair combination data of said memory section, which matches obtained pair combination when said parameter Pa is set to "0".

8. The radar detector according to claim 6, wherein said controlling section decides the frequency of said radar signal on the basis of said pair combination data of said memory section, which matches any of +1 to −1 of the obtained pair combination when said parameter Pa is set to "1".

9. The radar detector according to claim 6, wherein said controlling section decides the frequency of said radar signal on the basis of said pair combination data of said memory section, which matches any of +2 to −2 of the obtained pair combination when said parameter Pa is set to "2".

10. The radar detector according to claim 1, wherein said controlling section decides the frequency of said radar signal on the basis of one segment number for the X band radar signal.

11. The radar detector according to claim 1, wherein said pair combination data includes frequency data for the segment number and fundamental frequency, second harmonics frequency and third harmonics frequency.

12. The radar detector according to claim 1, wherein said voltage controlled oscillator generates a signal of frequency of 11.2796 GHz to 11.9832 Ghz and said plurality of local oscillators generates signals of frequencies of at least 0.603 GHz and 1.3668 GHz.

13. The radar detector according to claim 1, wherein said controlling section decides the frequency of said radar signal on the basis of the following equations;

$$Freq(RX)=n*Freq1(Lo)+/-1*Freq(Lo(\alpha))$$

$$Freq(RX)=n*Freq2(Lo)+/-1*Freq(Lo(\beta))$$

where

Lo($\alpha$) and Lo($\beta$) are the frequencies of said local oscillators;

Freq(RX) is the incoming signal frequency;

Freq1(Lo) is the frequency of said voltage controlled oscillator at time of detecting Freq(RX);

Freq2(Lo) is the frequency of said voltage controlled oscillator at time of detecting Freq(RX);

Freq(Lo($\alpha$)) is the frequency of one of said local oscillators;

Freq(Lo($\beta$)) is the frequency of one of said local oscillators;

Freq(2nd Lo($\alpha$))≈Freq(2nd Lo($\beta$)).

14. A radar detector comprising:

an antenna for receiving radar signals;

a receiving section which demodulates the radar signal received by said antenna based on output signals of local oscillators; and a controlling section which, after demodulating a radar signal by said receiving section, decides the received frequency of said radar signal and counts the number of demodulated signals during a receiving sequence, which is used to recognize the environment of straying signals, and generates an alarm signal on the basis of said number of demodulated signals.

15. The radar detector according to claim 14, wherein said controlling section does not generate said alarm signal if said number of detected signals is Nm(H) or more while on the highway.

16. The radar detector according to claim 14, wherein said controlling section does not generate said alarm signal if said number of demodulated signals is Nm(C) or more in a city area.

17. The radar detector according to claim 14, wherein said controlling section does not generate said alarm signal if the signals are demodulated in predetermined range of adjacent segments.

18. A radar detector comprising:

an antenna for receiving radar signals;

a receiving section which demodulates the radar signal received by said antenna based on output signals of local oscillators;

a controlling section which, after demodulating a radar signal by said receiving section, decides the received frequency of said radar signal; and a filter circuit at a demodulation port, which reduces demodulated noise for X band and K band and lowers the threshold level so as to maximize sensitivity.

19. A microwave receiving circuit comprising:

a first local oscillator which generates a first local signal;

a first mixer in which a input signal is mixed with the output signal from said first local oscillator and a signal of a frequency of the difference between the frequencies of the mixed signals is output therefrom;

a second local oscillator which generates a second local signal;

a second mixer in which a output signal from said first mixer is mixed with the output signal from said second local oscillator and a signal of a frequency of the difference between the frequencies of the mixed signals is output therefrom; and a controlling section which sweeps frequency of said first local oscillator so as to obtain a first receiving result when said second local oscillator oscillates at a first frequency and sweeps frequency of said first local oscillator so as to obtain a second receiving result when said second local oscillator oscillators at a second frequency and decides the frequency of said input signal on the basis of said first receiving result and said second receiving result.

20. The microwave receiving circuit according to claim 19, further comprising a bias circuit which supplies a bias voltage to said first mixer, wherein said bias voltage is supplied to said first mixer when said input signal is included in X band or K band and said bias voltage is not supplied to said first mixer when said input signal is included in Ka band.

21. The microwave receiving circuit according to claim 19, said controlling section which counts the number of detected signals during a predetermined period and change a alarm condition on the basis of said number of detected signals.

22. The microwave receiving circuit according to claim 19, further comprising a filter circuit which has message bandwidth for receiving bands respectively, wherein said controlling section selects said message bandwidth and receive said input signal.

23. The microwave receiving circuit according to claim 22, wherein said controlling section controls a threshold level on the basis of noise level which is changed by selecting of said message bandwidth.

* * * * *